United States Patent
Mansbery et al.

[11] Patent Number: 6,121,593
[45] Date of Patent: *Sep. 19, 2000

[54] HOME APPLIANCES PROVIDED WITH CONTROL SYSTEMS WHICH MAY BE ACTUATED FROM A REMOTE LOCATION

[75] Inventors: David I. Mansbery, Brecksville, Ohio; Kenneth D. Landry, Apex, N.C.

[73] Assignee: Duck Creek Energy, Inc., Brecksville, Ohio

[*] Notice: This patent issued on a continued prosecution application filed under 37 CFR 1.53(d), and is subject to the twenty year patent term provisions of 35 U.S.C. 154(a)(2).

[21] Appl. No.: 09/136,723

[22] Filed: Aug. 19, 1998

[51] Int. Cl.$^7$ .................................................... H05B 6/64
[52] U.S. Cl. ........................... 219/679; 219/720; 219/495
[58] Field of Search ................................ 340/638, 310.01, 340/870.02; 165/12, 48.1, 63, 64; 99/419, 484; 219/679, 678, 702, 714, 720, 495, 506; 364/131

[56] References Cited

U.S. PATENT DOCUMENTS

| | | | |
|---|---|---|---|
| 4,131,786 | 12/1978 | Cooper | 1/2 |
| 4,398,651 | 8/1983 | Kumpfer | 221/6 |
| 4,703,359 | 10/1987 | Rumbolt et al. | 5/44 |
| 4,812,963 | 3/1989 | Albrecht et al. | 364/131 |
| 4,816,635 | 3/1989 | Edamura | 6/68 |
| 4,884,626 | 12/1989 | Filipowski | 165/12 |
| 5,378,874 | 1/1995 | Hollimg et al. | 1/2 |
| 5,553,609 | 9/1996 | Chen et al. | 394/630 |
| 5,616,269 | 4/1997 | Fowler et al. | 219/720 |
| 5,710,409 | 1/1998 | Schwarzbacker et al. | 1/2 |
| 5,711,606 | 1/1998 | Koether | 374/149 |
| 5,859,596 | 1/1999 | McRae | 340/870.02 |
| 5,875,430 | 2/1999 | Koether | 705/1 |
| 5,900,801 | 5/1999 | Heagle et al. | 340/286.09 |
| 5,905,648 | 5/1999 | Badami | 364/148.1 |
| 5,939,974 | 8/1999 | Heagle et al. | 340/286.09 |

*Primary Examiner*—Teresa Walberg
*Assistant Examiner*—Jeffrey Pwu
*Attorney, Agent, or Firm*—Shawnell Williams, Esq.; John L. Gray, Esq.; Kegler, Brown, Hill & Ritter

[57] ABSTRACT

A self-contained refrigerator and oven, for refrigerating and cooking food in the same enclosed chamber, which can be actuated by the operator from a variety of remote locations around the world via telephone or the internet. The heating element may be a microwave unit and the refrigerating means may be a thermoelectric heat pump.

4 Claims, 10 Drawing Sheets

Microfiche Appendix Included
(4 Microfiche, 359 Pages)

HOME APPLIANCES PROVIDED WITH CONTROL SYSTEMS WHICH MAY BE ACTUATED FROM A REMOTE LOCATION

REFERENCE TO MICROFICHE APPENDIX

The software specified in the invention is contained in the 4 microfiche including 359 frames accompanied with the patent application.

BACKGROUND OF THE INVENTION

Many families today have two wage earners and as a consequence, there can be a significant delay when they both return from work before the evening meal can be prepared. Not only that, but sometimes their schedules change during the day so that the time when the evening meal is to be prepared must be changed.

There are a number of disclosures in the prior art of combination refrigeration systems and heating units where the food is confined to the same space. U.S. Pat. No. 3,353,476, Goodman, et al., is an example of this, as is U.S. Pat. No. 4,886,626, Filipowski. While the prior art discloses various devices for pre-programming heating and cooking units, there is no showing of a unit that can be actuated subsequently by telephone circuit or Internet. In addition to the heating and cooling of foods, it is also sometimes desirable to actuate remotely other home appliances such as a washing machine or a dryer. Again, the prior art does not disclose any means for remotely actuating such home appliances.

BRIEF SUMMARY OF THE INVENTION

The instant invention contemplates the remote actuation of home appliances using a specific control system. The invention also contemplates the concept of actuating a combination cooling and heating mechanism from a remote location so that food may be preserved in a refrigerated state during a finite period of time and then the refrigeration may be turned off and the cooking system may be actuated from a remote location.

It is therefore an object of this invention to provide a food heating and cooling unit, which may be actuated from a remote location. It is a further object of this invention to actuate home appliances from a remote location utilizing a specific method and mechanism of doing so.

This, together with other objects of the invention, will become apparent from the following detailed description of the invention and the accompanying drawings.

DETAILED DESCRIPTION OF THE INVENTION

Figure 1:
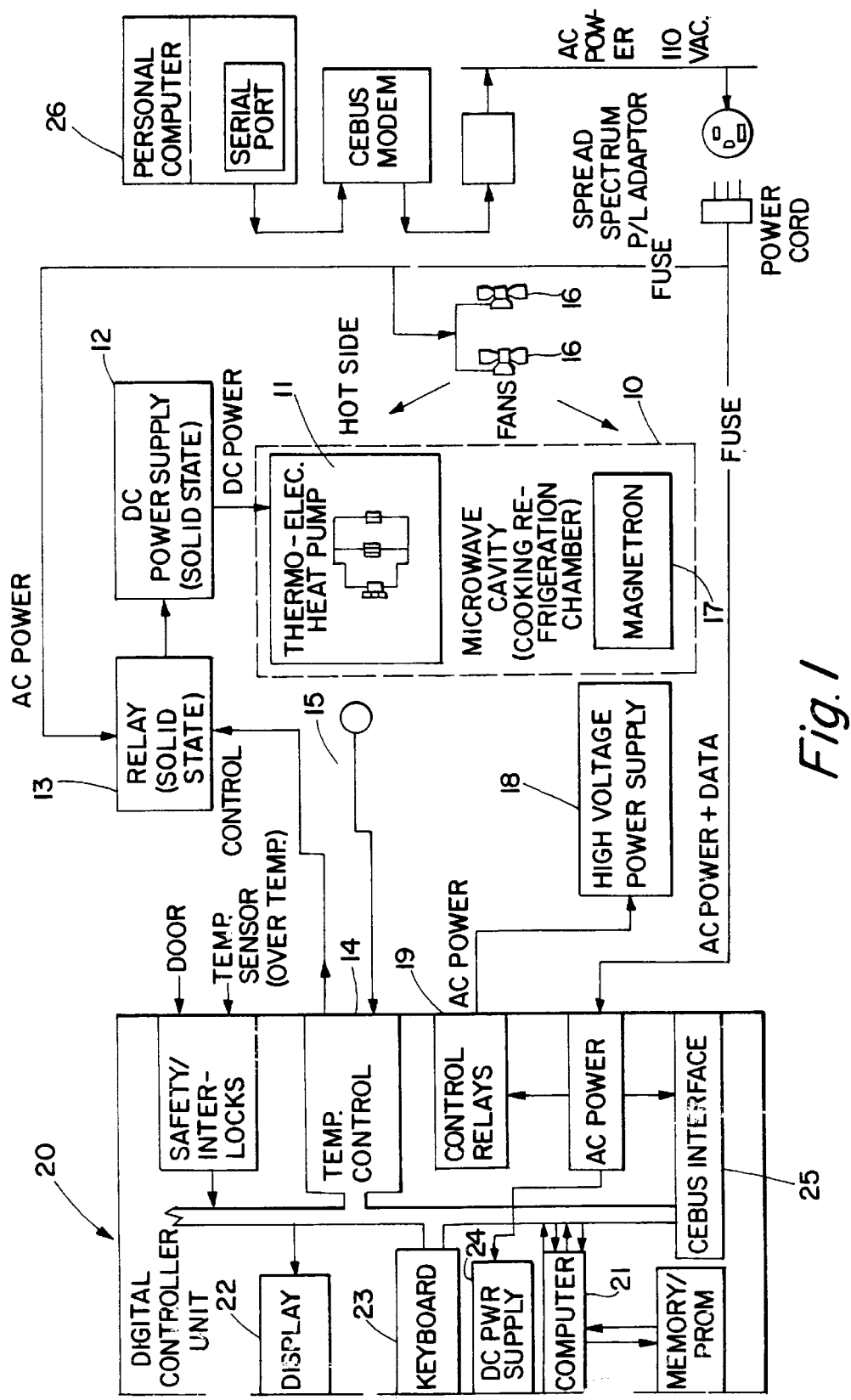
FIG. 1 is a functional block diagram of Applicant's invention as applied to a combination refrigerating and cooking system for food, which may be actuated from a remote location.

Referring now to FIG. 1, the cooking and refrigeration chamber is indicated at 10 in dotted outline. Contained within this chamber is a thermoelectric heat pump 11 that is utilized for removing heat energy from the cavity when electric power in the form of DC voltage from 12 is applied to its terminals. The DC power is supplied as needed from a relay 13 and by means of the temperature control 14 which in turn is controlled by the temperature sensor 15. AC power is supplied to the relay 13 as shown. Fans 16-16 are used in two different functional parts of the refrigeration system. Cold side fans circulate air in the oven chamber to transfer heat energy from the oven chamber to the thermoelectric heat pump cold side. Hot side fans circulate the ambient air through the thermoelectric heat pump hot side to transfer the before mentioned heat energy into ambient air.

The microwave cooking system is made of the following elements. It involves the oven cavity 10, a magnetron 17 which is a radio frequency transmitting device and a high voltage DC power supply 18. The oven cavity 10 safely contains radio frequency electromagnetic energy used for heating any contents placed inside it. The necessary door for user access to the oven chamber is an integral component of the oven cavity and is not shown.

The magnetron 17 which is a microwave radio frequency transmitting device converts high voltage DC electrical energy from the high voltage power supply 18 to microwave radio frequency electromagnetic wave energy. The frequency and field strength of the wave energy causes resident molecular motion of water molecules inside the oven cavity and from this molecular motion, heat energy is derived from the normal functioning of a microwave oven. The high voltage DC power supply 18 converts AC electrical energy at household voltage levels to high voltage DC energy. The typical high voltage DC power supply 24 may have as few as three components. These are a step-up transformer, high voltage diode and high voltage capacitor. Such structure is well known in the art and not shown. The oven cooking function is controlled by gating AC power from the power distribution network through a relay 19 to the high voltage power supply 18. The digital controller unit 20 comprises the following items: computer 21 with microprocessor with random access memory and read only memory for control program storage and operation, visual alpha/numeric display 22, and data/control entry keyboard 23. Also included is the Consumer Electronics BUS ("CEBUS") interface circuits 25.

In operation, the computer 21 executes a control program stored in electronic memory and by using input/output signals which enable the multiple functions of the digital controller unit 20. These functions are 1) receiving operating commands and data from the data/control entry keyboard; 2) displaying cooking times and related information and providing visual operator feedback for keyboard data entries; 3) monitoring safety interlock switches such as the door as well as temperature sensors; 4) control signals to power control relays which in turn actuates the thermoelectric heat pump refrigeration system or the magnetron microwave cooking system; 5) manage internal clock and timing functions as required; 6) responding to control requests submitted via digital control from remote locations.

The alpha/numeric display 22 informs the user of important information such as cooking time, operating mode and visual operator feedback of keyboard keys pressed.

Provision has also been included for the complex LED DISPLAY from the front of the microwave cooker. This includes a remote display interface circuit board, which interfaces with the LED Display of the microwave directly and relays the display contents at any point in time to the internal CEBUS controller. The CEBUS controller requests the display contents up to 10 times a second. The CEBUS controller then packages up the display sequences and sends it out across the power line. The appliance server running on the home computer receives the display sequence and upon request relays this information on to the current programs running on the home computer or at the office.

The keyboard data control entry 23 is an array of electronic switches located at the front of the digital controlling unit. The switches are interfaced with the computer and provide the user a method of entering data and commands to the computer. Each switch enters specific information such as numeric values zero through nine; direct commands start/stop, etc.; automated macro commands designed to reduce user time and involvement (i.e., potato sets cooking time appropriate for cooking a potato, initiates the cooking process and stops the operation after the specified time). The front panel provides legend labels which denote the purpose of each keyboard button. This is typical of a state of the art microwave oven.

The DC power supply 24 receives AC power from the electrical power distribution and produces all DC voltage and current required to operate the digital controlling unit. The CEBUS interface 25 provides communication with remote control of four functional categories: temperature control, electrical power control, safety interlocks and remote control. An electronic temperature sensor (not shown) located in the cold air path is electronically interfaced to the computer. This allows the computer control algorithm stored in memory to measure the refrigerator temperature if the measured temperature is above an established set point or correction signal is sent to a control relay that energizes the refrigeration system. This is mutually exclusive of cooking activities of course.

The electronic power control at the CEBUS interface 25 is provided to allow low voltage, low power logic signals from the personal computer 26 to energize or de-energize control relays that activate the cooking system or refrigeration system.

The software involved consists of three major parts. The first part is the appliance server which directly controls all of the appliances in a home. This is accomplished using the CEBUS protocol which is designed specifically for home networks. The second part of the software portion of Applicant's invention is a Graphical User Interface (GUI) for easily controlling home appliances as well as managing the meals that are to be cooked. The third part of the software allows homeowners to control and monitor their appliances while away from the home through the GUI or from their favorite worldwide web browser. Many homes and small offices are being equipped with "Thin Servers". These so called "Thin-Servers" are appliance-like devices that control home computer/print networks, Internet connections, home lighting and intelligent appliances such as CEBUS compliant products. The home computer or "Thin-Server" can be used to monitor and control the home appliances, including microwaves, ovens and refrigerators, as well as other appliances. The protocol used to control such an appliance from the home server is one that has been developed specifically for the home network CEBUS. The CEBUS protocol allows one to provide an abstract definition of say an appliance and be able to query it and perform operations on it. CEBUS can operate over many different types of networks, power lines, radio frequency, coaxial cable and twisted pair, as well as others. The Applicant's invention uses existing power lines in an existing home to communicate to the appliances. This avoids retrofitting a home with a new network. Applicant's invention uses object oriented methodologies in many ways. The system is written in C++, an object oriented language. Second, the CEBUS protocol is object oriented by design. Each CEBUS device is considered an object with attributes that can be interrogated or changed directly via operations or methods. Lastly, the technology used to communicate with the home appliances from anywhere in the world is called CORBA, which stands for Common Object Request Broker Architecture. Essentially, this technology allows one to easily design objects (such as home appliances) in one's home. These objects can be directly manipulated from any computer around the world.

The use of CORBA is an important aspect of Applicant's software architecture. A CORBA object on the home server is built for each home appliance. These objects take requests from the software to control the appliance. The software could be located locally on the home server or could be remotely located at one's office in another state or country. This allows a homeowner to remotely monitor their home with unprecedented ease and ability. One can also use any worldwide web browser, such as Microsoft Internet Explorer and Netscape Navigator/Communicator, to monitor or control a home appliance. This is accomplished by using a version of Applicant's software which is written as a Java applet. This applet is launched within the browser and provides the means to communicate with CORBA objects on one's home server that controls the home appliances. The home appliances are controlled via software running on the home server. The home server must be able to communicate using the CEBUS protocol via some network media. The powerline interface for communicating information between the microwave and the home server is used. The software on the home server that controls the home appliance is called the appliance server. This is a C++ program that among other things understands CEBUS. When started, the appliance server searches for all home appliances in the home. It does this by broadcasting a CEBUS request on the powerline to which all CEBUS compliant home appliances respond. Response includes its address on the network, the type, manufacturer and model of the appliances. The appliance server knows, based on the appliances manufacturer and model, how to control the appliance. After discovering all home appliances in the home, the appliance server then creates a CORBA object for each appliance. If the home appliances are powered on after the appliance server has started, the appliance broadcasts an announcement that is received by the appliance server. The appliance is then made available via a CORBA object.

The CORBA interface is as follows.

SetClock (Integer Hours, Integer Minutes)
GetStatus (Integer Status)
StartCooling ( )
StopCooling ( )
SetCookTime (Integer Hours,
Integer Minutes,
Integer Seconds)
SetTemperatureLevel (Integer Temp)
GetTemperatureLevel (Integer Temp)
Cancel ( )
Start ( )
ReadDisplay (String DisplayStr)
SetSafeTemperatureLevel (Integer Temp)

This is the basic interface required to control any home appliance. Other interfaces can be provided based upon the type, manufacturer and model of a specific home appliance.

The CORBA objects representing home appliances wait for requests. Applicant's software GUI and Applicant's Java applet are two programs that communicate with the CORBA objects in order to control the appliances. These programs are referred to as CORBA clients. Once the client programs connect to these objects, they operate on them as if they were locally defined and created within the client program. The client programs can then use the object's interface to manage the remote appliance.

As far as safety is concerned, the CORBA object provides an interface for specifying a safe temperature level. If the temperature of the unit rises above this level, the CORBA object will tell the home appliance to shut down. The object will also notify all client programs that are connected to it that a high temperature condition has occurred. An object can also notify all connected clients if a home appliance has stopped responding to input.

The core of Applicant's software system is the management/GUI software written for Microsoft Windows that allows the user to view each home appliance being controlled. Each appliance can be programmed to keep a dish cool until it is time to be cooked. Dishes can be defined by the user which spells out the steps to cook the dish and whether or not it needs to be kept cool before cooking.

A major feature of Applicant's software is the ability to monitor and manage home appliances from remote locations. Applicant's software accomplishes this by providing an appliance server that runs on the home server. This software object is a CORBA server that spawns a COBRA appliance object for each home appliance that it discovers on the home network. These appliance objects continually monitor the real home appliance as well as wait for the GUI software to connect to it. The Applicant's software that connects the appliance objects is referred to as client software. The client software can be run at home on the home server or on another machine in the home. CORBA objects are inherently distributed. This means that not only can any computer in the home manage home appliances through the COBRA appliance objects, but from any computer in the world, one can monitor and manage appliances in their home. The client software described earlier communicates with appliance objects residing on the home server. The client software is configured with the Internet address of the home server. This allows it to remotely communicate with the home server through the Internet. The client software communicates with the appliance objects through a well known port number. The client software transparently makes requests to the home objects which passes the requests along to the real appliance.

It is not necessary to have the menu management software installed in order to remotely monitor and manage home appliances in one's home. All it takes is a worldwide web browser such as Microsoft Internet Explorer Netscape Navigator/Communicator. The Applicant's software is also available in the form of a Java applet that can be run from the browser. Having the software available from a browser, users can use just about any type of computer operating system to remotely connect to their home and control home appliances. This gives people unprecedented access and control over their home while away.

Figure 2:
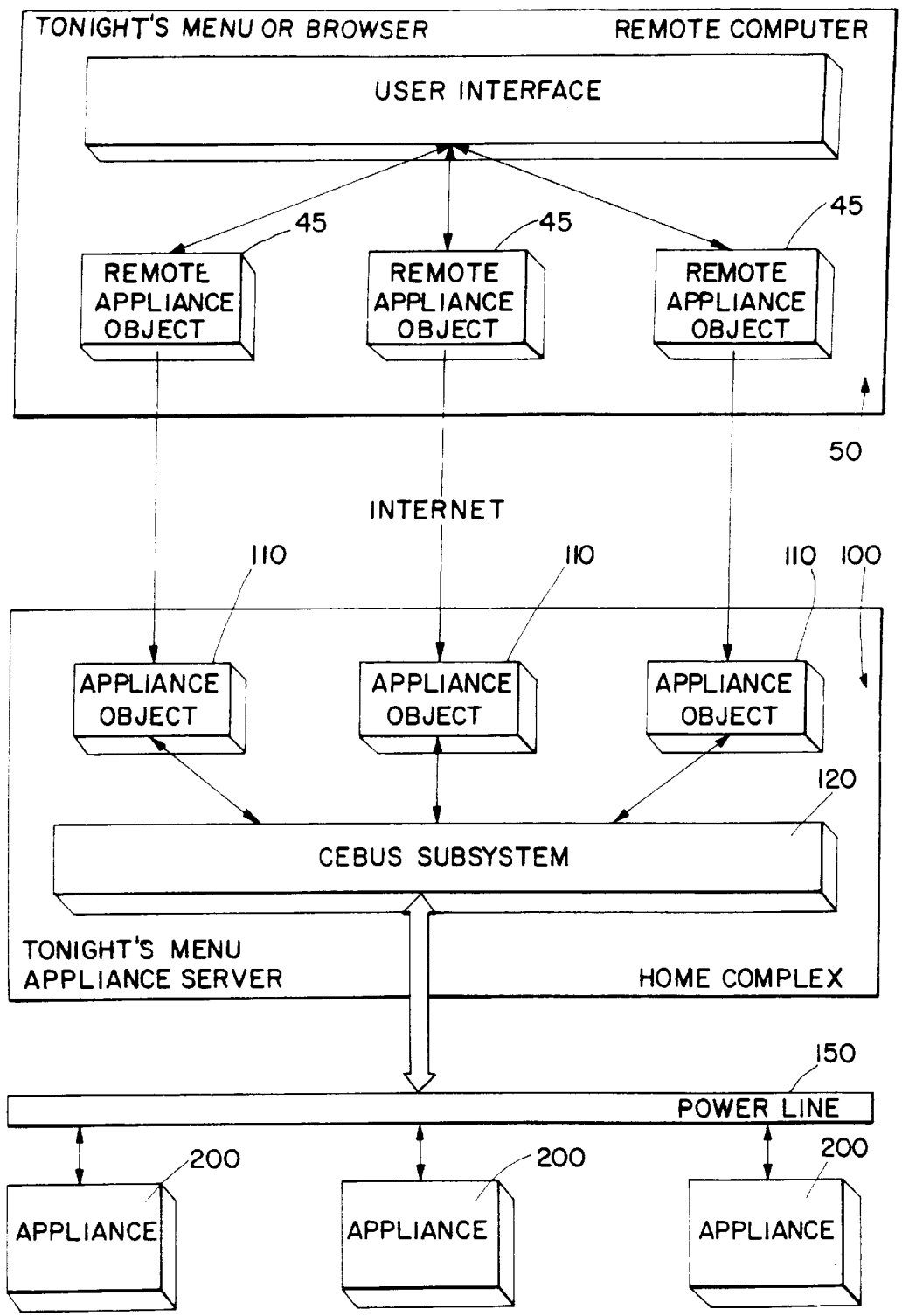
FIG. 2 is a block diagram overview of the software included in Applicant's invention.

Referring to FIG. 2, a block diagram representation of the overall software included in the invention. Two major components of the software used by the invention are shown in FIG. 2. The first software component runs on the home computer and has been titled Tonight's Menu Appliance Server Software 100. The Tonight's Menu Appliance Server Software 100 can be attached to a power line 150 via a variety of computer industry communication protocols. The present invention discloses a CEBUS Subsystem protocol 120 to communicate with the home appliances 200. The Tonight's Menu Appliance Server Software 100 receives information from the internet and translates this information into specific commands to operate the home appliances 200.

After the Tonight's Menu Appliance Server Software 100 is started, it will initialize the CEBUS Subsystem 120 and identify the various home appliances 200 that are connected to the power line 150 and enable communication with the CEBUS Subsystem 120. The Tonight's Menu Appliance Server Software 100 will also create a COBRA appliance object 110 for each home appliance 200 that can communicate with the CEBUS Subsystem 120. The COBRA appliance objects 110 will allow the Tonight's Menu Client Software or Browser Software 50 to locate the COBRA appliance objects 110 through the Internet and communicate with the Tonight's Menu Appliance Server Software 100.

Thus, a user on a remote computer running the Tonight's Menu Client Software 50 connected through the Internet through the CORBA appliance objects 110 to the Tonight's Menu Appliance Server Software 100 can communicate and operate home appliances 200.

Figure 3:
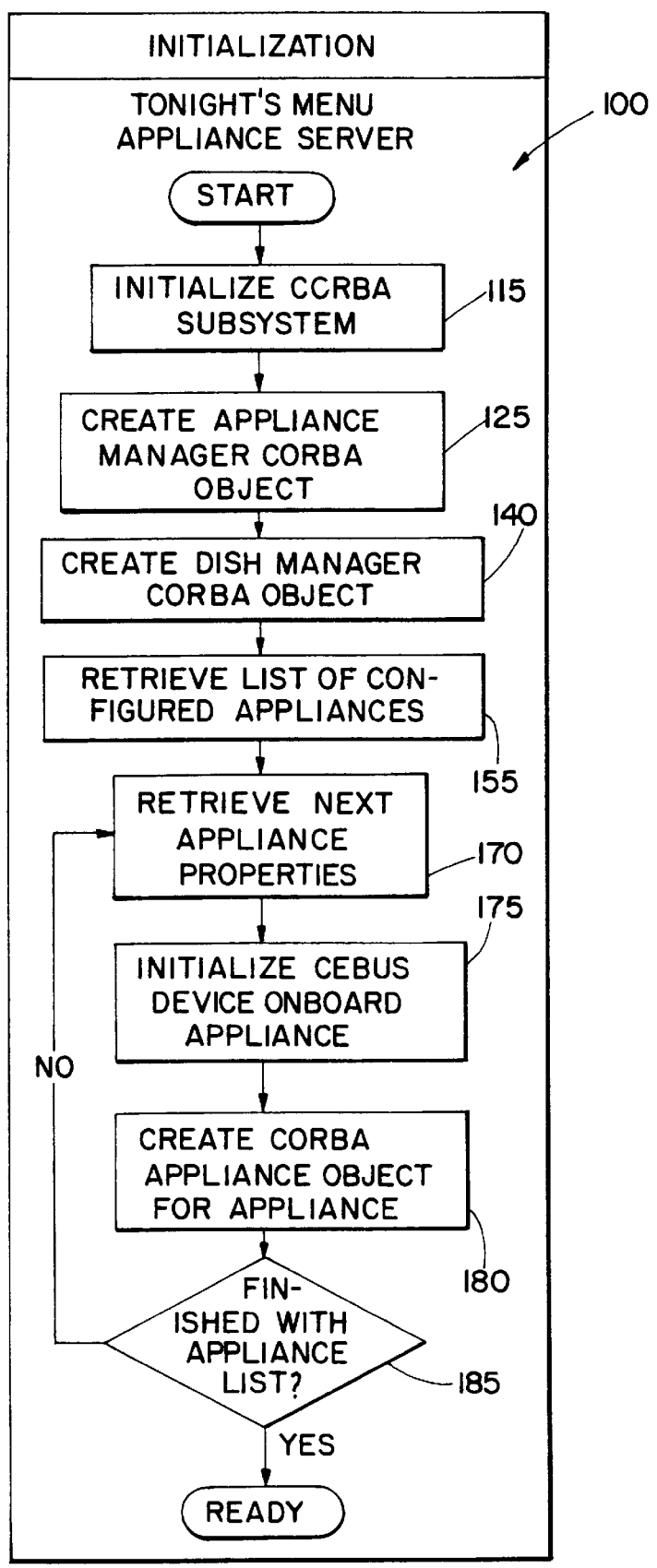
FIG. 3 is a flow chart describing the initialization of the home appliances for remote access.

Referring to FIG. 3, the Tonight's Menu Appliance Server Software 100 is brought on line in phases. First, all the Appliances 100 to be connected to the system have to be turned on. Second, the Tonight Menu Appliance Server Software 100 has to be started. After the Tonight Menu Appliance Server Software 100 is started, it will initialize the CORBA Subsystem 115 which broadcasts out on the power line 150 (FIG. 2) it's address on the network. The CEBUS Subsystem 120 (FIG. 2) acts as a network where every appliance 200 (FIG. 2) is identified by an address that is available to anyone accessing the CEBUS Subsystem 120.

The Tonight Menu Appliance Server Software 100 will create a COBRA appliance manager object 125 which provides a well known object for managing the set of discovered appliances. The Tonight's Menu Appliance Server Software 100 will also create a COBRA food dish manager object 140 that provides a well known object for management of defined food dishes.

The user configures and selects what appliances 200 will be used to prepare the food dishes for the day. Once the user has selected the appliances 200, a list of those appliances 200 will be contained in a initialization file. The Tonight's Menu Appliance Server Software 100 will retrieve the list of configured appliances 155 and communicate with the configured appliances 200 to ascertain what type of appliance it is, whether a microwave or conventional oven, what model, what are its capabilities, etc. After this information has been obtained, the Tonight's Menu Appliance Server Software 100 will initialize the CEBUS device on board each appliance 175 and create a CORBA appliance object for all the appliances 180. The Tonight's Menu Appliance Server Software 100 initialization routines form the framework for communicating with the Tonight's Menu Client Software 50.

Figure 4:
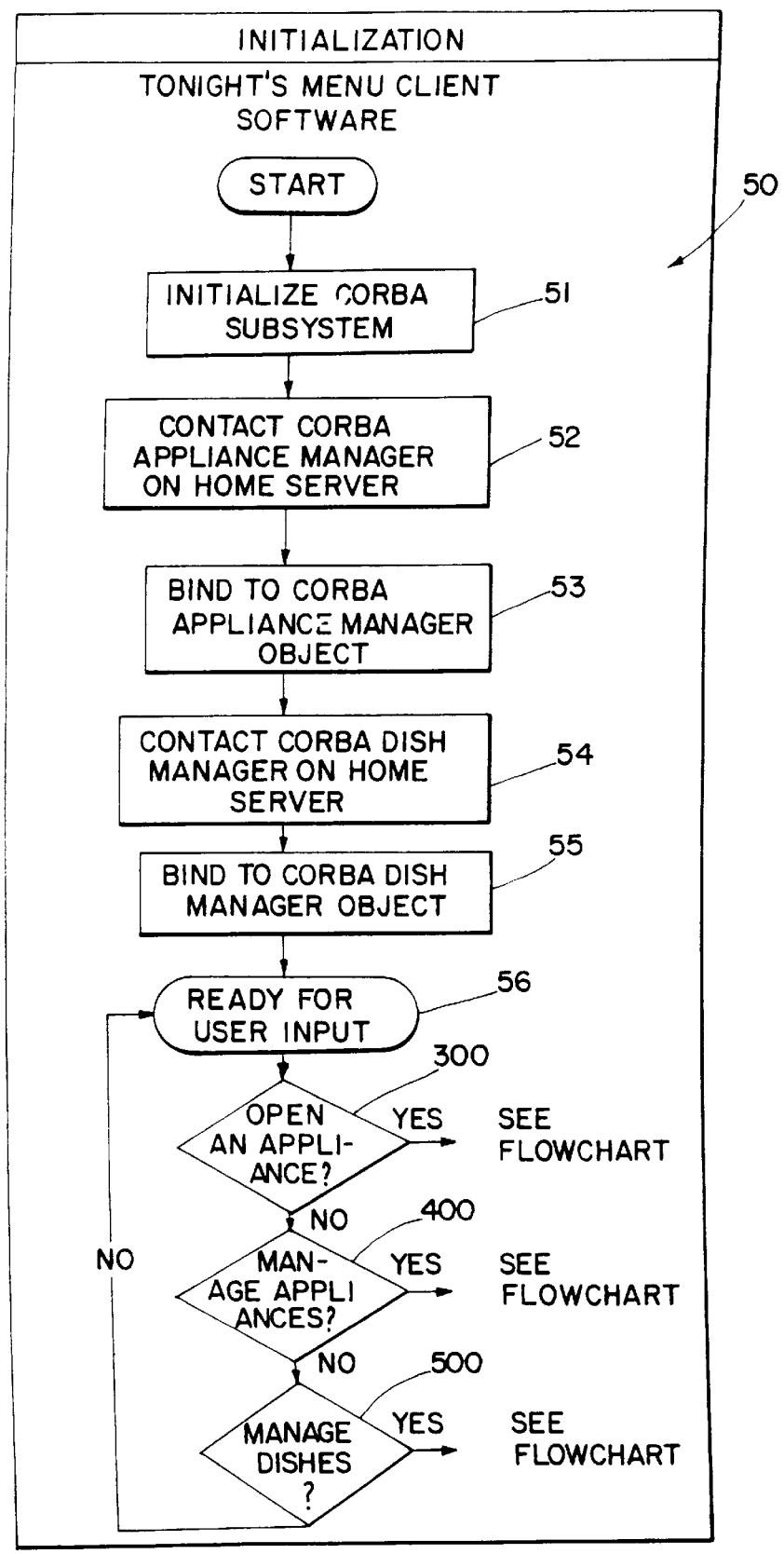
FIG. 4 is a flow chart describing the remotely located software used to communicate with the home appliances from a remote location.

Referring to FIG. 4, the Tonight's Menu Appliance Software 50 contains the procedures for communicating with the Tonight's Menu Appliance Server Software 100 in diagramatic fashion. In the figure, the procedure is commenced with a CORBA Subsystem initialization routine 51. The CORBA Subsystem initialization routine 51 initializes an object request broker, which allows the user to communicate between the Remote Appliance Object 45 and the CORBA appliance objects 110 located on the user's home computer.

The CORBA Subsystem Initialization Routine 51 will contact the CORBA Appliance Manager 52 on the Tonight's Menu Appliance Server Software 100 and obtain information regarding the various Appliances 200 connected to the Tonight's Menu Appliance Server Software 100. Once the CORBA Subsystem Initialization Routine 51 has obtained a list of Appliances 200 connected to the Tonight's Menu Appliance Server Software 100, the Tonight's Menu Client Software 50 Remote Appliance Objects 45 will bind to the Tonight's Menu Appliance Server Software's 100 CORBA Appliance Manager Object 53.

In addition, the CORBA Subsystem Initialization Routine 51 will also contact the CORBA Dish Manager 54 on the Tonight's Menu Appliance Server Software 100 and obtain information regarding the various food dishes to be prepared. After the CORBA Subsystem Initialization Routine 51 has received the information regarding the food dishes, the Tonight's Menu Client Software's 50 will bind to the Tonight's Menu Appliance Server Software's 100 CORBA Dish Manager Object 55. Upon completion of the binding process, the Tonight's Menu Client Software 50 will allow the user to Open An Appliance 300, Manage An Appliance 400 or Manage Dishes 500.

Figure 5:
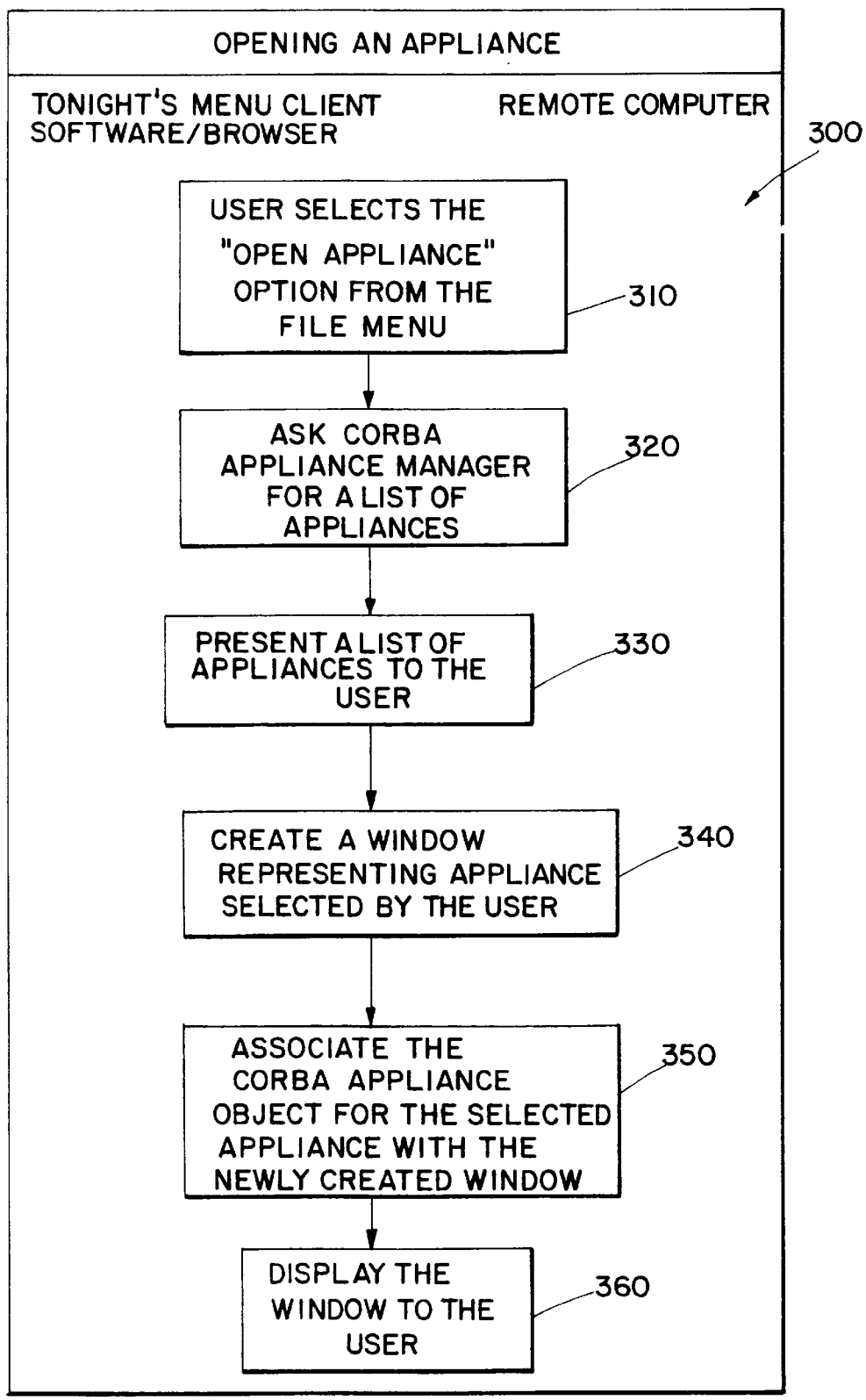
FIG. 5 is a flow chart illustrating the selection of a particular home appliance for remote operation.

Looking to FIG. 5, the Opening An Appliance Software 300 allows the user to access an Appliance 200 using Applicant's invention. The user will select the open appliance option from the file menu 310. This will indicate to the Tonight's Menu Client Software 50 that the user wants to view or act upon a particular appliance 200 that is managed by the Tonight's Menu Appliance Server Software 100. At Block 320, the Tonight's Menu Client Software 50 communicates with the Tonight's Menu Appliance Server Software 100 located on the home computer through the appliance manager CORBA object. A list of defined appliances 200 is retrieved from the appliance manager. This list is used to display a list of available appliances 330.

When the user has selected an appliance to open, a user interface window is created 340. This window will graphically represent the microwave or conventional oven that is being controlled. This includes the portrayal of keypad buttons as well as an LED Display of the appliance 200. The selected CORBA object is then associated with the window representing the appliance 350. Finally, the window is displayed in the Tonight's Menu Client Software 50. This function also includes automatically updating the LED Display without the users need to interact.

Figure 6:
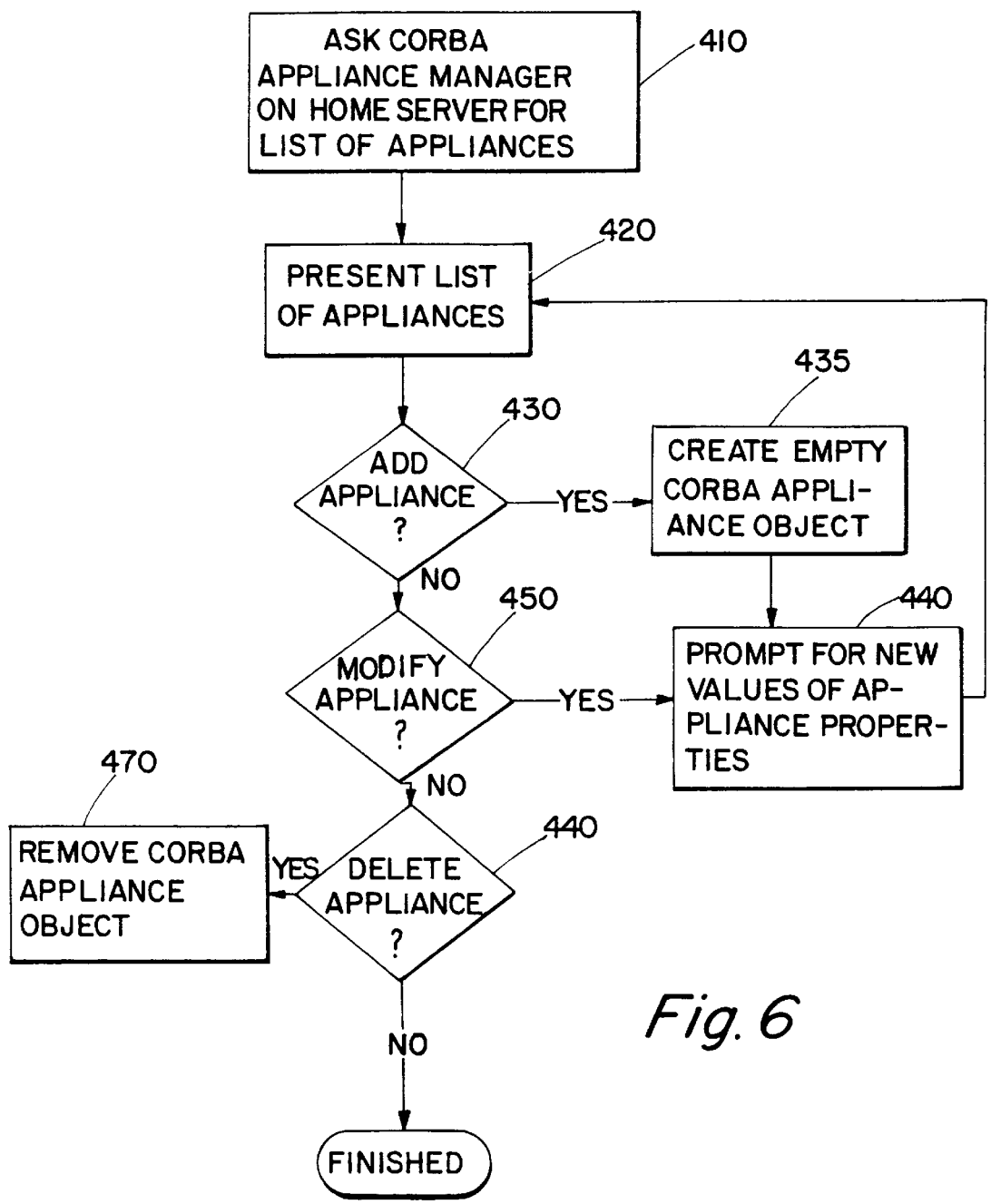
FIG. 6 is a flow chart describing management of the home appliances, which includes determining which home appliances will be available for possible remote access.

FIG. 6 illustrates the various options a user can exercise regarding the management of appliances software 400 that is specified in block 410 to 470. The list of appliances and the information about the appliances 200 is stored on the home computer. The Management of Appliances Software 400 allows the user to modify and maintain the information regarding the appliances 200 remotely. Block 410 shows the Management of Appliances Software 400 interrogating the CORBA Appliance Manager on the Tonight Menu Appliance Server Software 100 for the list of appliances. After the CORBA Appliance Manager receives the list of all the CORBA appliance objects 110, it will present the list in a list box and the user will have several options available. The options the user will have available pertaining to the list box includes being able to add an appliance 430, modify an appliance 450 and delete an appliance 460.

An appliance is added by sending a message to the CORBA Appliance Manager 52 requesting to add an appliance 430. This message is a function call on the appliance and on the CORBA Appliance Manager 52. The Tonight's Menu Appliance Server Software 100 will create a CORBA Object and make it available for communication. Once that is complete, an empty CORBA Appliance Object 435 will be created and a dialogue box will appear on the Tonight's Menu Client Software 50 and prompt the user for new information regarding the capabilities of the appliance 440. After the use enters the appliance information including the appliance's CEBUS address on the home computer, this information is transmitted to the home computer and stored in the initialization file which will be retrieved the next time the Tonight's Menu Appliance Serve Software 100 is started.

The Modified Appliance 450 and the Delete Appliance 460 activities are contained in Blocks 430 through 470. Block 450 shows where the decision is made whether to modify the appliance 200, if the decision is yes, the user is prompted for new information regarding the appliance 440. If the user makes the decision to delete an appliance 460, the CORBA Appliance Object is removed 470.

Figure 7:
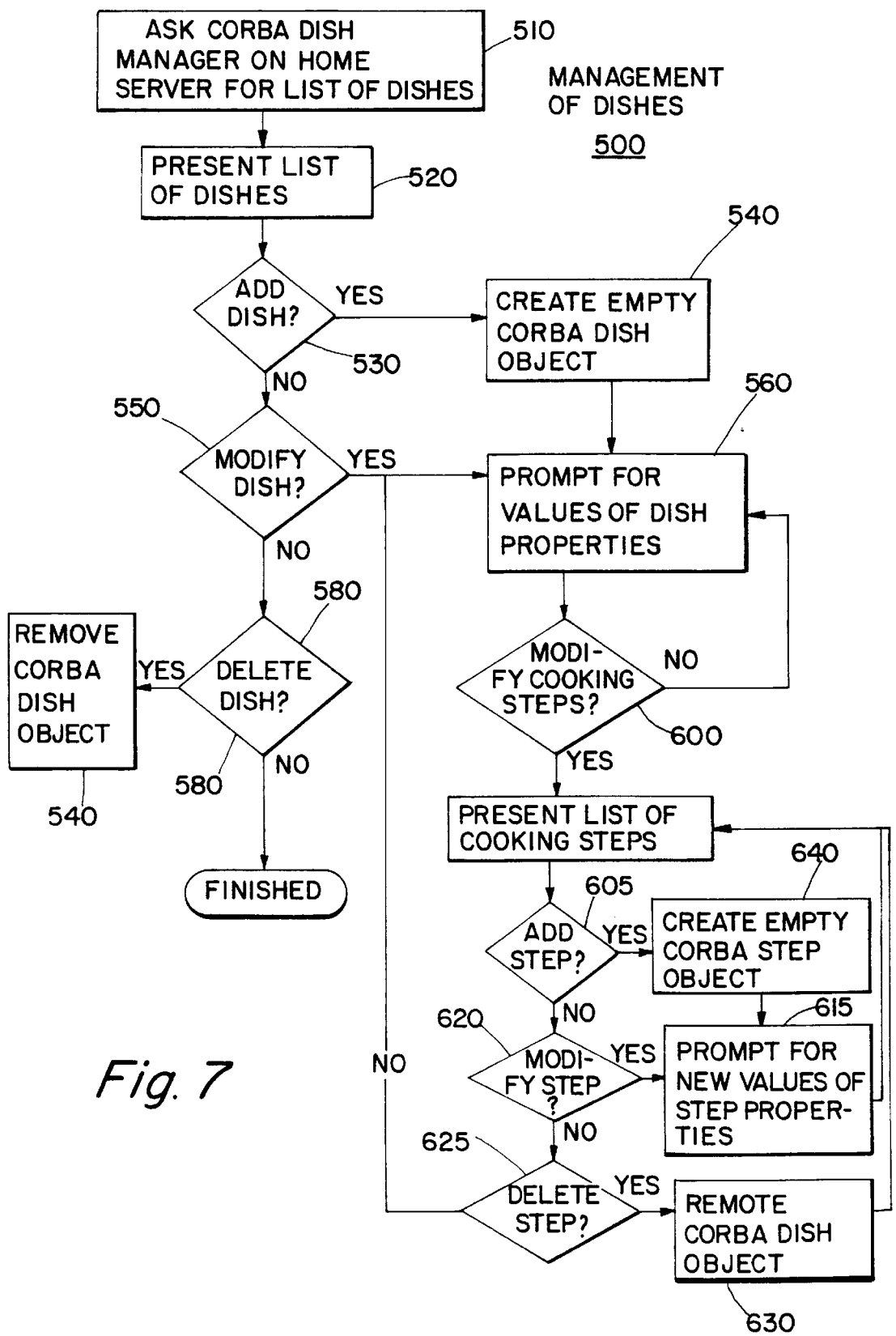
FIG. 7 is a flow chart illustrating the determination of food dishes that will be available for preparation in the home appliances from a remote location.

FIG. 7, discloses the management of dishes software 500 flow chart which details the steps necessary for an appliance 200 to prepare a food dish. The dish manager CORBA object 510 is located on the home computer in order to centralize the management of the food dishes. The management of dishes software 500 allows the user to add a food dish 530, modify food dishes 550, modify cooking steps 570 or delete food dishes 580.

Once the user is presented with a list of food dishes 520, the user can choose to add a dish 530 and the program will create an empty CORBA dish object 540. The software will prompt the user for new values of dish properties or cooking information 560. This information would include a description of the food dish, comments regarding the food dish, list of cooking steps and whether the food dish should be kept cool prior to cooking. If the user selects the modify dish option 550, the user will again be prompted for new values of dish properties 560. At this point, the user can modify a variety of information regarding the food dish including the description of the food dish or the cooking steps.

Blocks 605 through 630 illustrate how to add a cooking step, modify a cooking step or delete a cooking step. A cooking step includes the cooking duration, the cooking time in hours, minutes and seconds, cooking temperature for conventional ovens and cooking levels for microwaves. If the user chooses to add a cooking step, the software will add a cooking step 605 after it presents the user with a list of the present cooking steps 600. The software will create an empty CORBA step object 610 and prompt the user for new values of step properties 615. The user will also be prompted for new values of step properties 615, if the user selects the modify step 620 option. Furthermore, a cooking step can also be deleted 625 by removing the pertinent CORBA dish object 630.

Figure 8:
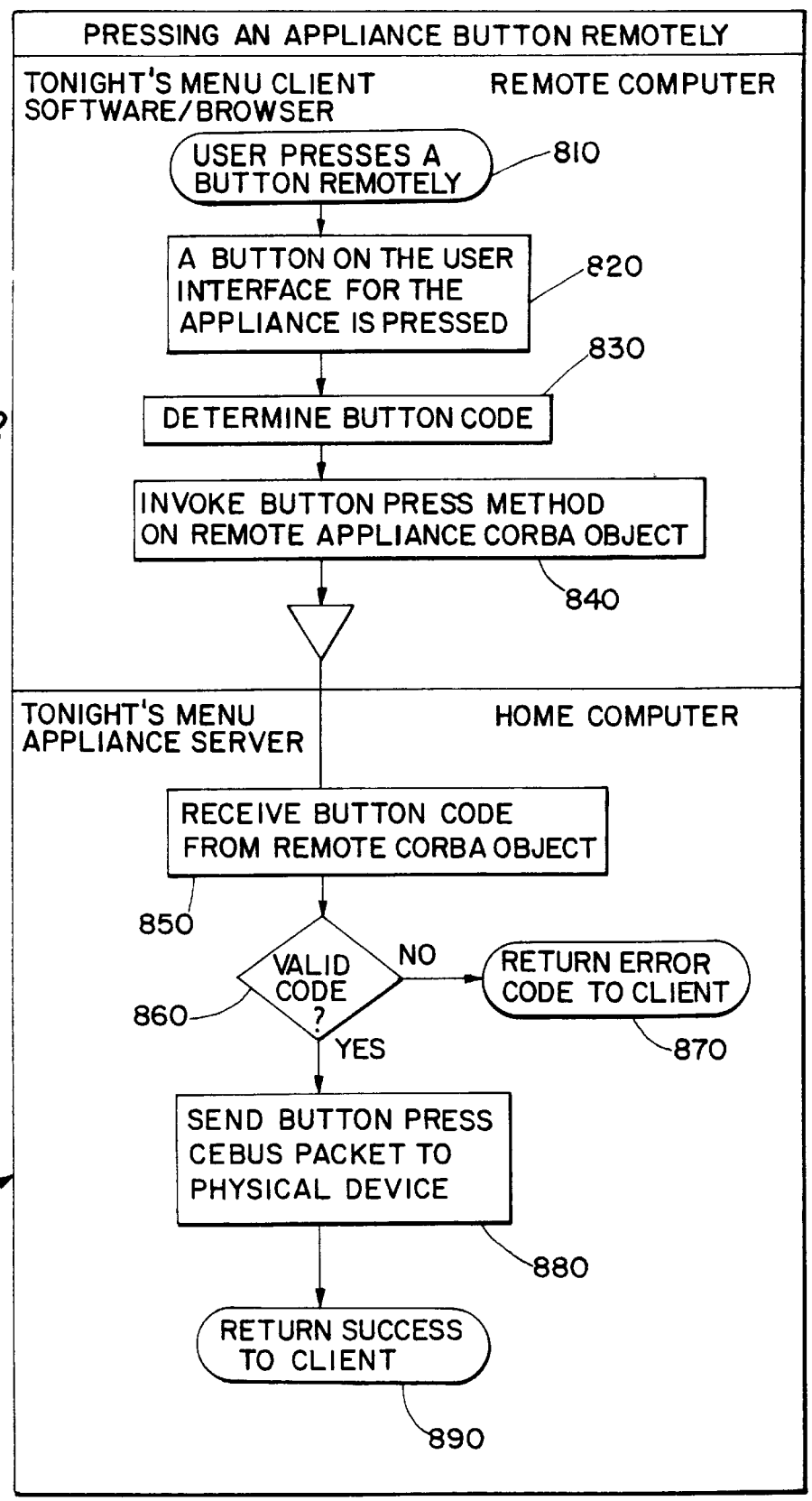
FIG. 8 is a flow chart describing how the home appliances operation buttons are accessed from a remote location.

Referring to FIG. 8, the flow chart illustrates utilization of the Tonight's Menu Client Software 50 in combination with the Tonight's Menu Appliance Server Software 100 to operate a home appliance 200 from a remote location. After the user has executed the opened an appliance software 300, the user can press a button on the remotely located user interface for the particular appliance 820 to be used. The software will analyze and determine the button code 830 and invoke the button press method on a remote appliance CORBA object 840. Information regarding a particular button that was pressed by the user will be transmitted from the Tonight's Menu Client Software 50 to the Tonight's Menu Appliance Server Software 100.

Once the Tonight's Menu Appliance Server Software 100 receives this information, the receive button code from remote CORBA object 850 will begin processing this data. The button information will be checked to ascertain whether it is a valid code 860, and if not, an error message 870 will be sent to the user. If the button information is a valid code, the data will be translated into the appropriate CEBUS packet and transmitted to the specific appliance 880 to be used. The Tonight's Menu Appliance Server Software 100 will notify the user that it has successfully received the user's remote button command.

Figure 9:
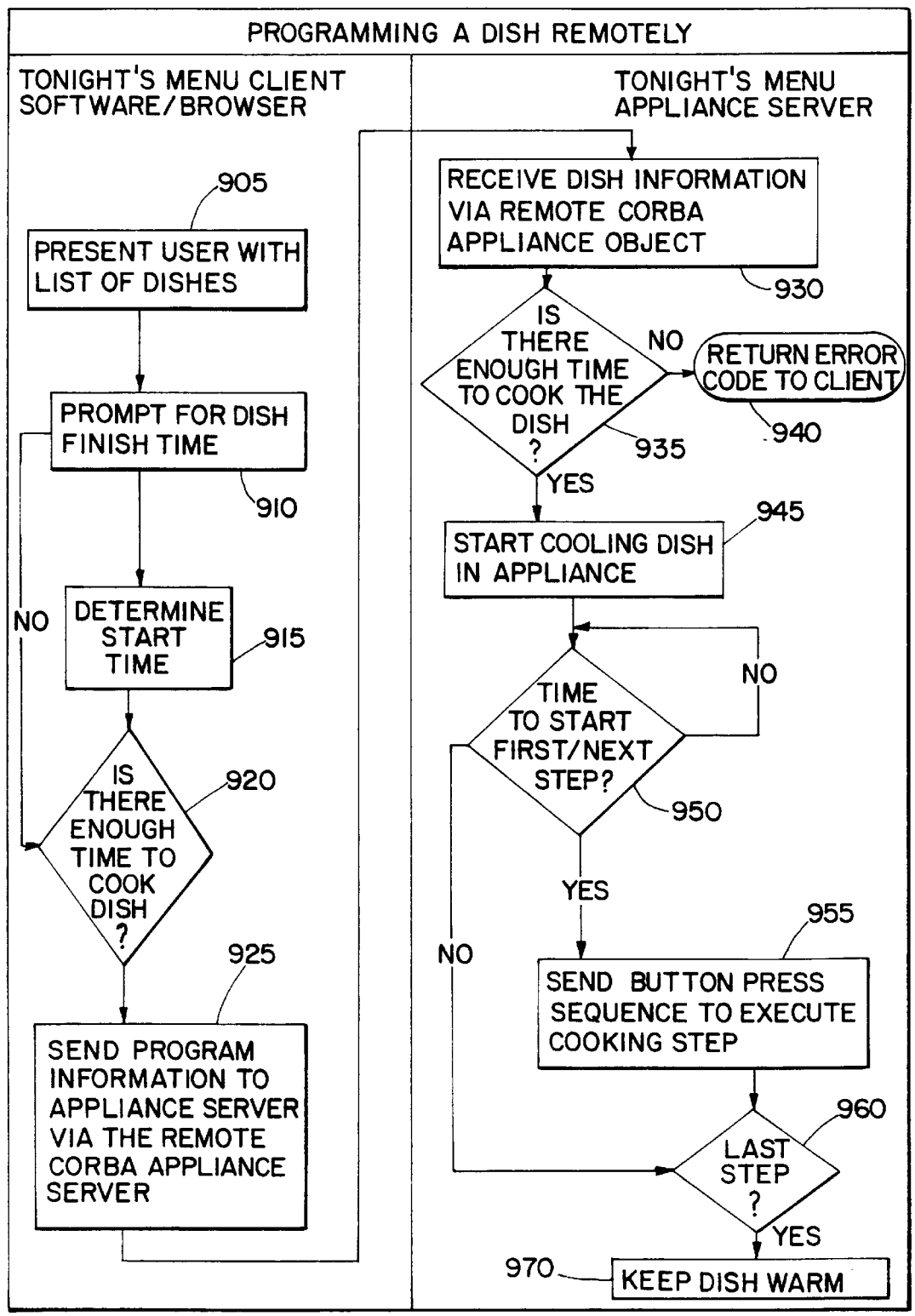
FIG. 9 is a flow chart illustrating how a food dish is programmed for preparation in a home appliance from a remote location.

FIG. 9 provides a flow chart describing how a user would program an appliance to prepare a food dish from a remote location 900. Blocks 905 through 925 illustrate how the user would be presented with a list of dishes 905 and be prompted to supply the software with a specific time when the food dish is to be ready 910. Once the Tonight's Menu Client Software 50 has received the proposed finished times for the food dish 910, the software will determine the appropriate start time 915. The software will calculate whether the time required to prepare the meal is sufficient in order to complete the meal by the finish time selected by the user 920. If there is insufficient time to prepare the dish before the finish time, the software will loop back and request the user to re-enter another dish finish time. However, if there is enough time to cook the dish 920, the food dish information will be sent to the appliance server via the remote CORBA appliance server 925.

The Tonight's Menu Appliance Server Software 100 will receive the food dish information via a remote CORBA appliance object 930. After the Tonight's Menu Appliance Server Software 100 has received the dish information, the Tonight's Menu Appliance Server Software 100, also performs a check to determine whether there is enough time to cook the dish 935. If there is not sufficient time to cook the dish before the dish finish time, the Tonight's Menu Appliance Server Software 100 will return an error code to the user. If there is sufficient time to cook the dish, the Tonight's Menu Appliance Server Software 100 will start cooling the dish in the appliance 945. The software will then determine the appropriate time to start cooking the dish in order to have it completed by the desired finish time.

The Tonight's Menu Appliance Server Software 100 will periodically check whether it is time to start cooking the dish 950. If it is time to start cooking the dish, the Tonight's Menu Appliance Server Software 100 will send the appropriate button press sequences to execute the predetermined cooking step 955. The program will determine if the software has reached the last cooking step 960. If the software has not reached the last cooking step, the program will loop back to the time to start cooking routine 950 in order to determine whether it is time to start the next cooking step. If the software has reached the last cooking step, then the software will provide the appliance 200 with instructions to keep the dish warm 970.

Figure 10:
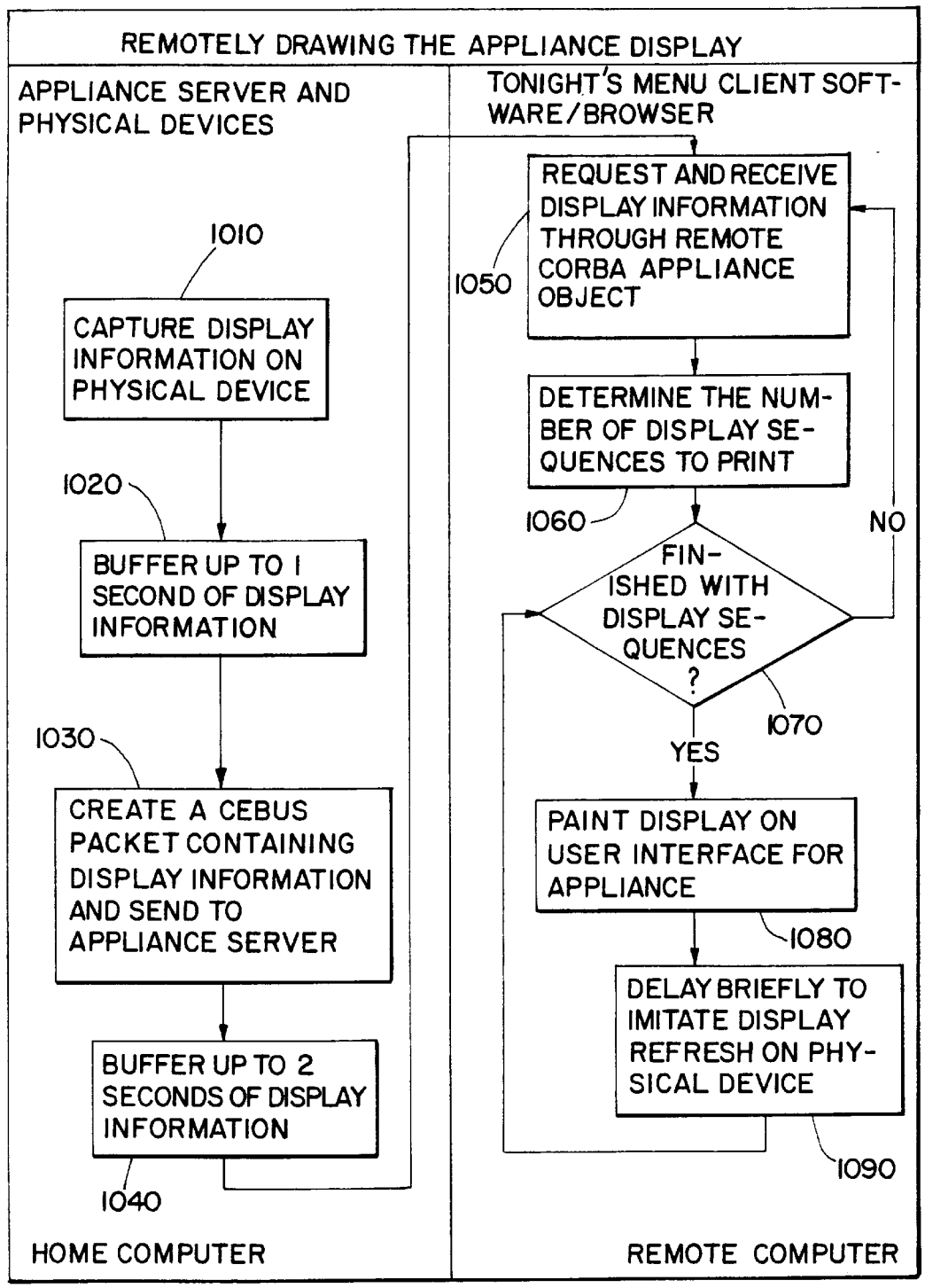
FIG. 10 is a flow chart describing the process for reproducing the information displayed by home appliance at a remote location.

FIG. 10, shows the flow chart for the remotely drawing the appliance display software 1000. This flow chart illustrates how the appliance's 200 display screen is able to be reproduced for the user at a remote location. The Tonight's Menu Appliance Server Software 100 uses a remote display interface circuit board ("RDIB") that allows for a real time remote location acquisition and display of a microwave or conventional oven's display screen. The RDIB acquires and processes the display data and on demand transmits it to the MAXI-PLC11 CEBUS adapter for eventual display at a remote location. A typical microwave or conventional oven will have a six position LED Display and there are sixteen segments in each position which the RDIB scans and captures the illuminated LED's on each of the six different positions for translation. The RDIB then translates the illuminated six different positions into a character or a number 1010.

The RDIB will buffer one (1) second worth of sequences of the display 1020 prior to translating the display information into a CEBUS packet. Once the one (1) second buffer of display information is translated into a CEBUS packet, this information is transmitted to the appliance server 1030. After the CEBUS packet is sent to the appliance server, the appliance server will buffer two (2) seconds of the display information 1040 prior to transmitting it to the Tonight's Menu Client Software 50. The buffering of an additional second of display information will improve the transmission process of the display information to the Tonight's Menu Client Software 50.

Once the Tonight's Menu Client Software has received the display information through the remote CORBA appliance objects 1050, the software will determine the number of display sequences to print 1060. The Tonight's Menu Client Software 50 will determine whether it has finished its display sequences 1070. If not, the software loops back to the receive display information through the remote CORBA appliance object routine 1050. If the Tonight's Menu Client Software 50 has finished with the display sequences, it will paint the display screen of the specified appliance on the user's remote interface 1080. The software will briefly delay the painting of the appliance's display information to imitate a display refresh process on an appliance 1090. Finally, the programs will loop back to the finish with display sequence 1070 in order to determine whether it has finished displaying all of the pertinent information.

While this invention has been shown and described with respect to a detailed embodiment thereof, it will be understood by those skilled in the art that various changes in form and detail thereof may be made without departing from the scope of the claims of the invention.

What is claimed is:

1. A combination refrigerator and cooker comprising:

a compartment provided with refrigerating means for keeping foods cold, said compartment also being provided with cooking means for cooking said food when said refrigerating means is turned off, a first means for controlling the operation of said refrigerating means and said cooking means, a second means for sending and receiving data concerning said refrigerating means and said cooking means to and from a remote location via telephone or the internet, whereby an individual may evaluate said data concerning said refrigerating means and said cooking means received through said second means thus enabling said individual to direct and control said first means through said second means.

2. A combination refrigerator and cooker of claim 1 wherein said refrigerating means is a thermoelectric heat pump and wherein said cooking means is a microwave oven.

3. The combination refrigerator and cooker of claim 1 wherein said second means of actuating said first means from a remote location include software run by home server capable of being able to communicate by using CEBUS protocol via network media.

4. The combination refrigerator and cooker of claim 3 wherein said communication is through a powerline interface.

* * * * *